Figure 1:
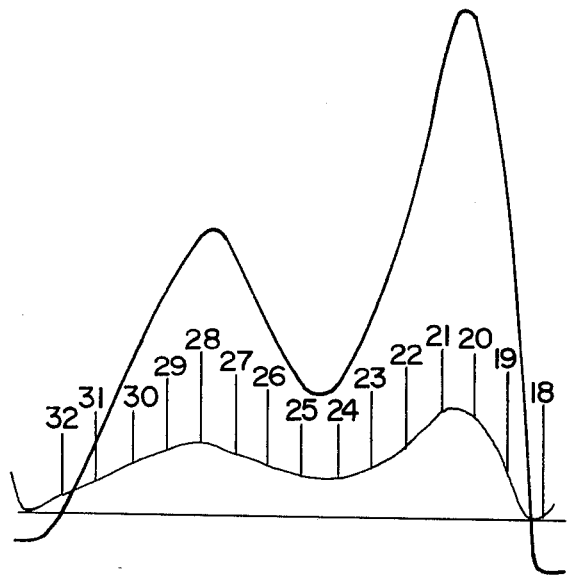

United States Patent
Halasa

[11] 3,966,691
[45] June 29, 1976

[54] POLYMERIZATION OF CONJUGATED DIENES WITH STARVED LITHIUM, POTASSIUM OR SODIUM CATALYST

[75] Inventor: Adel Farhan Halasa, Bath, Ohio

[73] Assignee: The Firestone Tire & Rubber Company, Akron, Ohio

[22] Filed: Feb. 19, 1974

[21] Appl. No.: 435,395

Related U.S. Application Data

[63] Continuation-in-part of Ser. No. 378,763, July 12, 1973, abandoned.

[52] U.S. Cl. .................... 526/78; 220/1 R; 260/94.2 M; 427/239; 428/35; 526/174; 526/180; 526/217; 526/339; 526/340
[51] Int. Cl.² .................... C08D 1/20; C08D 3/08
[58] Field of Search ................ 260/83.7, 82.1, 88.1, 260/94.2 M, 84.7

[56] References Cited
UNITED STATES PATENTS

| | | | |
|---|---|---|---|
| 2,527,768 | 10/1950 | Schulze | 260/83.7 |
| 2,631,175 | 3/1953 | Crouch | 260/669 |
| 3,284,430 | 11/1966 | Forman | 260/94.2 |
| 3,287,333 | 11/1966 | Zelinski | 260/83.7 |
| 3,451,988 | 6/1969 | Langer, Jr. | 260/94.6 |
| 3,488,332 | 1/1970 | Hiraoka | 260/83.7 |
| 3,536,679 | 10/1970 | Langer, Jr. | 260/83.1 |
| 3,736,312 | 5/1973 | Halasa | 260/94.2 |

FOREIGN PATENTS OR APPLICATIONS

| | | | |
|---|---|---|---|
| 836,189 | 6/1960 | United Kingdom | 260/94.2 M |

*Primary Examiner*—Christopher A. Henderson, Jr.

[57] ABSTRACT

A linear conjugated diene of 4 to 8 carbon atoms or a mixture of such conjugated dienes or a mixture of such a conjugated diene and a vinyl aromatic monomer is polymerized in a monomer-starved process to yield homopolymers of copolymers of low molecular weight containing as low as 35 and up to 90 or 95% or more of microcyclic structures, if properly catalyzed and depending upon the temperature and other conditions of the reaction. These microcylic structures are defined as microcyclic rings of molecules containing 6 to 18 or more alkylene units. These cyclic structures are produced by the monomer-starved process which causes the bond between the carbon and the metal to bite back on itself. The catalyst used in the production of these microcylic polymers is a combination of (1) zero-valent lithium, sodium or potassium metals or an alkyl derivative thereof, preferably in combination with (2) a chelating tert-diamine, such as N,N,N',N'-tetramethylene diamine, spartein or a bicyclic amine such as DABCO (1,4-diazabicyclo[2,2,2]octane). Thus, when the catalyst is only lithium, sodium or potassium or an organo derivative thereof, due to the starved catalyst procedure more or less of the polymer is cyclized, depending upon the temperature and other conditions of the reaction. If a chelating diamine is also used as catalyst, an increased amount of cyclized polymer is present in the product. If the catalyst also includes an alkoxide of an alkali metal different from the alkali metal previously mentioned, a higher per cent of cyclized polymer is formed, such as perhaps 40 to 60 per cent or more. The invention includes solid polymer which contains sufficient cyclized units to produce very low shrinkage during curing in the mold; and includes such molding processes. A variety of products of different molecular weights, etc. can be produced.

5 Claims, 5 Drawing Figures

FIG. 4
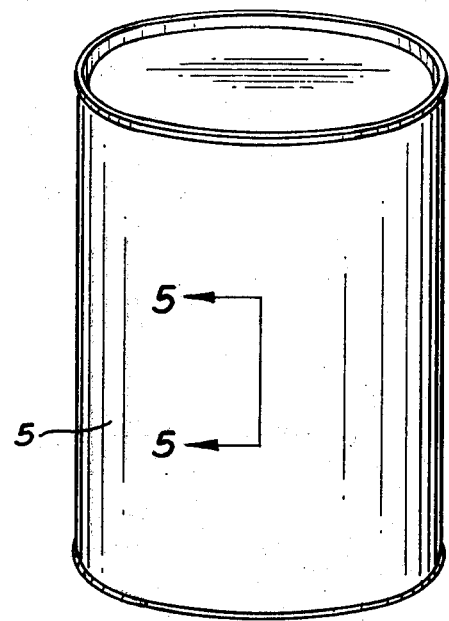
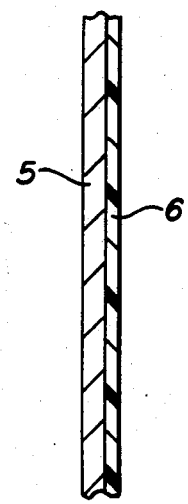
FIG. 5

POLYMERIZATION OF CONJUGATED DIENES WITH STARVED LITHIUM, POTASSIUM OR SODIUM CATALYST

This application is a continuation-in-part of my application, Serial No. 378,763 filed July 12, 1973 (now abandoned).

SUMMARY OF THE INVENTION

This invention relates to the polymerization of a linear conjugated diene which contains 4 to 8 carbon atoms, or a mixture of such conjugated dienes or a mixture of such a conjugated diene and a vinyl aromatic monomer. It includes the production of cyclized polymers having a wide range of properties. With polymers of higher content of cyclized units, if cured in a mold, only slight shrinking occurs so that the configuration of the interior of the mold is closely reproduced in the surface of the molded product. Alternatively, the polymers of lower cyclized contents, which have greater shrinkage may be applied as a liquid before curing. The polymers may have a molecular weight of 500 to 12,000 or more. The total unsaturation in the polymer may be as great as 90% or more and the content of cyclized polymer in the product may be 10 to 60 percent or more.

The supply of linear conjugated diene to the polymerization vessel may be controlled so that only a minimum amount of unpolymerized monomer is present during the polymerization. As a result, the polymer product contains anywhere from about 10 to 60 or more percent of microcyclic structure of some 6 to 18 or more alkylene units. These cyclic products are formed under starved monomer conditions which cause a polymer with a terminal C-Li, C-Na or C-K bond to bite back on itself.

Thus, the invention includes the process of using a monomer-starved condition during the polymerization, the polymer products, and the process of molding of highly cyclized polymers and obtaining from the mold a product which has shrunk a minimum amount during molding. It also includes products of a low content of cyclized units which may be used for coating.

Regardless of their molecular weight, the products having a higher content of cyclized polymer and a lower content of unsaturated polymer, have a lower shrinkage; and the products having a lower content of cyclized polymer and a higher content of unsaturated polymer, have a higher shrinkage.

The conjugated diene usually employed is butadiene-1,3 although the process is equally applicable to linear alkyl derivatives thereof such as isoprene, dimethyl butadiene-1,3, decadiene-1,3, hexadiene-1,3, etc. and copolymers thereof.

The most usual aryl vinyl monomer for copolymerization with the conjugated diene is styrene. Other vinyl monomers which may be used include the vinyl naphthalenes and alkyl styrenes which contain 1 to 4 carbon atoms in the alkyl group including, for example, 3-methylstyrene, 4-methylstyrene, 2,4-dimethylstyrene, 4-isopropylstyrene, etc.

Mixtures of such conjugated dienes and aryl vinyl monomers may be used, and the conjugated dienes and vinyl monomers may be used in any desired ratio with one another to give a range of products. Usually, when a vinyl monomer is used, the vinyl monomer content will be 25 to 40 mole percent with 75 to 60 percent of conjugated diene.

The catalyst used in the production of these cyclized derivatives is, per 100 grams of monomer, (1) 5 to 200 millimoles of metallic lithium or preferably metallic sodium or potassium or an alkyl derivative of any such metal in which the alkyl group contains 1 to 8 carbon atoms, or the aryl derivative of such a metal, preferably with (2) as an activator, 5 to 200 millimoles of a chelating diamine including the tetraalkylalkylene-diamines, spartein and bicyclic tetraalkyldiamines such as 1,4-diazabicyclo (2,2,2) octane (DABCO). To speed up the reaction, such catalysts may be used with 5 to 200 millimoles of an alkali metal alkoxide per 100 grams of monomer, the alkali metal being different from that mentioned in the catalyst.

The tetraalkylalkylenediamines which may be used as activators include compounds in which the alkyl group may be straight chain or branched, saturated or unsaturated, and contain 1 to 8 carbon atoms, and the alkylene group may be straight or branched chain and contain 1 to 10 carbon atoms. Examples are the tetramethyl, tetraethyl, tetrapropyl, tetrabutyl, tetrapentyl, tetrahexyl, tetraheptyl, tetraoctyl and tetraalyl, etc., methylene, ethylene, propylene, butylene, pentylene, hexylene, pentylene, octylene, nonylene and decylene diamines. The preferred diamine is tetramethylethylenediamine (TMEDA).

The nature of the polymer produced in this monomer starved process can be varied by controlling the temperature of the reaction and the rate at which the monomer is added to the process and the residence time of the polymer in the reactor. The temperature can be varied within the range of about 0° F. to 300° F., and the rate of addition of monomer to the polymerization vessel to control the cyclic content can vary anywhere between about 0.5 to 10 pounds of monomer per hour. The residence time may vary from 0.5 to 20 hours depending upon the temperature, etc. and the type of product desired. The molecular weight may vary between about 500 and 12,000 or more.

Different products are obtained by polymerizing at a different temperature.

1. If the polymerization is carried out at a lower temperature, less cyclized polymer is present in the product. This product is good for coatings, etc.

Thus, the polymerization may be carried out at a lower temperature of about 0° to 25° to 150° F. The residence time of the polymerizable material in the polymerization vessel may be about 6 hours, (using a pumping rate of about 0.5 to 10 pounds of monomer per hour into a 13-gallon reactor) while feeding a solution of about 20 percent of one or more monomers to the reactor in 80 percent of hexane or other hydrocarbon solvent. The reaction mixture is allowed to remain in the reactor until the reaction has been completed. A polymer is produced with a molecular weight of about 500 to 12,000, a vinyl content about 50 to 85 percent; the cyclized polymer content being about 3 to 15 percent (as obtained by NMR determination), the total unsaturation (non-cyclized monomers) in the product is 97 to 85 percent. This is representative of the polymer of lower cyclized polymer content produced according to this invention, whether or not the monomer feed includes vinyl monomer.

This product has a higher shrinkability, but is good for coating sheet materials, coating the interior of cans for foodstuffs, etc. and various solution applications. In these applications, shrinkage is not a factor because the polymer is cured on the surface of the metal. It is important that there be a high percentage of double bonds in the polymer to give a tight cure.

2. On the other hand, if the polymerization is carried out at 200° to 300° F., and the mixture of such monomers is fed to this reactor at a rate of 0.5 to 10 pounds per hour for a period of about 90 minutes to 2 hours, with a total residence time of 12 hours, the copolymer product contains 10 to 50 or more percent of cyclized polymer, which has a vinyl content of about 70 to 50 percent and a molecular weight of 500 to 12,000. These polymers, with a cyclized polymer content of up to 50% or more and a molecular weight of at least about 500 when cured in a mold with a peroxide curing agent have a shrinkage of no more than 5% and preferably in the range of 1 to 2% so that the configuration of the surface of the molded product is almost an exact complement of the inner surface of the mold.

The molecular weight of polymer as produced by the process of this invention may be as little as 500 or it may be several thousand or greater, up to about 12,000. The polymers have a dilute solution viscosity as low as 0.1.

Figure 2:
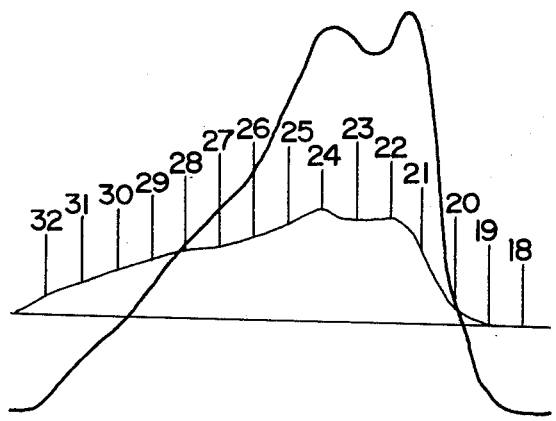
Figure 3:
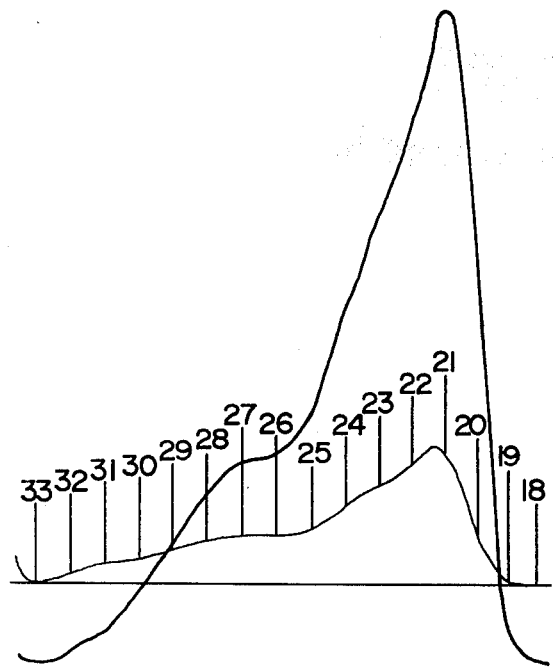

In the drawings:

FIGS. 1 to 3 are curves discussed following the portion of the disclosure pertaining to Examples 14–16; and FIGS. 4 and 5 are an elevation and section through a steel or aluminum can coated interiorly with a coating of polymer produced by solution in a hydrocarbon or by hot melt, etc., 5 representing the metal and 6 the interior coating.

The polymer vulcanizates, particularly those of a high content of cyclized polymer, produced by a peroxide cure formulation may be used where other resins are commonly used, as, for example, in sheet material containing embedded electrical circuitry and cured to form immovable parts, and for coatings, moldings, hose, mechanical goods, etc.; and an advantage in their use is that the cured products of higher content of cyclized polymer do not shrink to any appreciable extent when cured in a mold and during subsequent cooling. The peroxidecured polymers of low cyclized-polymer content are useful for coating metals.

PRIOR ART

Non-anticipating prior art includes Langer patents: 3,451,988, 3,536,679 and 3,450,795 which describe polymerizing with alkyllithium catalysts and tetraalkylalkylenediamine. None suggests polymerizing under starved monomer conditions or suggests that any cyclization occurs during the polymerization or describes properties of the polymers produced which are characteristic of a cyclized polymer.

German Offenlegungsschrift 2,063,643 of Lithium Corporation of America refers in Example No. 7 to polymerization of butadiene and the product of a polymer of low cis-content and containing 8.6 percent of cyclic polymer. The microstructure is very different from that of polybutadiene made by the process of this invention, and it is surprising that lithium-, sodium- and potassium-terminated polymers can be cyclized as disclosed herein.

Attention is also directed to McElroy et al. 3,678,121 which describes the production of cyclized polymer containing isotectic units containing aromatics. The polymers are produced in the presence of an aromatic compound such as toluene and contain one or more benzene rings per polymer chain.

The use of chelating diamines is known in the art, as in Langer 3,536,679 in which the diamine is used with a lithiated amine under conditions different from those of the applicant, and Langer 3,705,200 in which the diamine is used with an organo-sodium catalyst but under conditions very different from those disclosed here. Neither patent suggests using a polymerization bath having a starved monomer system such as is required to produce cyclization. The monomer-starved system used by applicant may comprise only lithium, sodium or potassium or a catalyzing derivative thereof, such as, for example, lithium sodium or potassium alkane or alkene which comprises 1 to 10 or 20 or more carbon atoms, lithium, sodium or potassium phenyl, tolyl, naphthyl, etc. and other derivatives known to be polymerization catalysts. This will produce perhaps 10 to 15% cyclization. Using a chelating diamine with the foregoing, the cyclization will run higher, perhaps in the range of 20 to 35 percent. If the catalyst includes also an alkoxide of an alkali metal different from the alkali metal just mentioned, the cyclization will run higher up to 50 or 60 or more percent.

THE INVENTION

The usual amounts of polymerization catalyst and any activator employed will be used; and usually about 50 to 100 millimoles of catalyst will be used per 100 grams of linear conjugated diene in the polymerization bath. Naturally, there is no shrinkage in liquid products, but only in solid products when cured; and solid products may comprise a liquid polymer mixed with other components to provide a moldable composition.

The starved monomer condition is usually maintained by adding the monomer to the catalyst at such a rate that complete polymerization takes place as the monomer comes into contact with the catalyst. The rate of monomer addition may vary with the catalyst activity and with the size of the reactor. The rate of the polymerization can be enhanced by adding the chelating amine and/or the alkoxide with monomer to the reactor containing the lithium sodium or potassium metal or organo derivative thereof. Any combination of such catalyst with or without activators such as disclosed, which activators enhance the rate of polymerization, may be used to produce a starved condition, and the manner of adding the various ingredients to the polymerization vessel may vary widely.

The composition of the polymer produced with a diamine as modifier can be distinguished from usual lithium polymers in that they have low 1,4-structure and high 1,2-structures. In the process of this invention, the cyclization takes place in solution in an aliphatic solvent without any reactive aromatic material other than sytrene or other aromatic monomer, if present, and the cyclic structures are aliphatic and are to be distinguished from those described by McElroy, et al. in U.S. Pat. No. 3,678,121.

The molecular weight distribution of the oils made by the McElroy patent is rather narrow since they are made by a lithium catalyst system and such systems are known to give narrow molecular weight distribution. However, the oils and other products produced by the process of this invention comprise branched chains and have broad molecular weight distribution if they are made by sodium or potassium catalyst systems. With a lithium catalyst, narrower molecular weight polymers are produced. It is unexpected from the chemistry of sodium and potassium metals that cyclization of lithium-, sodium- and potassium-terminated polymers leads to microcyclic polymers. Such cyclic structures are formed although the lithium sodium or potassium of the live polymers produced at the temperatures employed in this process would normally eliminate metal hydrides and thus terminate the reaction.

The literature contains voluminous material which refers to the instability of organo-sodium compounds and organopotassium compounds at temperatures used in carrying out this invention. See, for example, Sodium and Potassium Annual Survey covering the year 1970 by W. H. Glaze et al. in Organometallic Chemistry Reviews, Section B, Annual Surveys Vol. 8, pp. 319–332 (1971). It is also generally known that organo-sodium and organopotassium compounds are not useful initiators for polymerizations of conjugated dienes because of chain transfer which leads to low conversion and termination (Journal Polymer Sci., Vol. 9, pp. 2493–2502 (1971) and Vol. 11, pp. 253–259 (1973). However, the lithium polymer decomposes in the presence of the diamine to give cyclic product. The rate of decomposition is enhanced by the chelating diamine to give cyclic products, However, the process of this invention takes advantage of the transfer reaction when a sodium or potassium catalyst is used, and the instability of the lithium polymer at high temperature to produce cyclized polymer by using a monomer-starved process. For example, in this process the transfer reaction takes place at the polymer chain which leads to cyclization whereas in other processes the transfer takes place to monomer which leads to termination of the polymerization. It is the instability of the allylic lithium, sodium or potassium at high temperatures over 150° F. that leads to cyclization in the monomer-starved process, particularly in the presence of diamine, that leads to the unusually high content of cyclized polymer obtained by this process.

The invention is further disclosed in connection with the following examples, but is not limited thereto.

EXAMPLE 1

One thousand grams of hexane and 10 millimoles of sodium metal (in mineral oil - 40% sodium) per 100 grams are charged to a two-gallon reactor of the type usually employed in polymerization experiments. It is equipped with a mechanical stirrer, pressure retaining devices, means for excluding air and a cooling system. The temperature of the reactor is set at 230° F. and the nitrogen pressure is set at 103 psig. Six thousand grams of the monomer blend (17% butadiene-1,3 and 83% hexane) is gradually pumped into the reactor which contains the catalyst, at a rate of one pound per hour. This takes 12 hours, during which the reaction proceeds.

After the polymerization is complete and the solution of the polymer has been dropped, it is stabilized with the usual antioxidant. A sample of this polymer was analyzed for microstructure and dilute solution viscosity. Analysis of this polymer by infrared characterization shows that the cis-1,4 content is 15%, the trans-1,4 content is 30% and the content of 1,2 vinyl units is 54%, and the cyclized portion is 12% as determined by IR band at 11 to 12 mu. The cyclization portion as determined by Nuclear Magnetic Resonance (NMR) analysis is 12%. The Mn molecular weight is between 500 and 1200.

EXAMPLE 2

One thousand grams of hexane containing 10% 1,3-butadiene and 100 mM of sodium metal (in mineral oil - 40% sodium) are charged into a two-gallon reactor of the usual type employed for polymerization experiments. It is equipped with mechanical stirrer, pressure-retaining devices, means of excluding air and cooling system. The temperature of the reactor is adjusted to 100° F. and nitrogen pressure is set at 100 psig. Six thousand grams of monomer blend, 20% 1,3-butadiene, 80% hexane is gradually pumped into the reactor containing the catalyst at a rate of 2 pounds blend per hour. This took 6 hours residence time in the reactor. The polymer was then dropped and stabilized. The analysis of this polymer shows that the 1,2-content is 65%; cis-1,4 is 13%, trans-1,4 is 25.7%; and $\overline{Mn}$ is 500–1800, the total unsaturation is 95% and cyclization is 5%.

EXAMPLE 3

The procedure is the same as used in Example 1, except that 50 mM of N,N,N',N'-tetramethylethylenediamine (TMEDA) per 100 grams of 1,3-butadiene in hexane is added to the catalyst. Analysis by Infrared Spectroscopy of this polymer: 15% cis-1,4; 23% trans-1,4; 62% vinyl-1,2; and 30% cyclization by NMR and the unsaturation of 70%.

EXAMPLE 4

Procedure same as in Example 2. Analysis of the polymer: 72% 1,2; 19% trans-1,4; 9% cis-1,4; total found of 97% (total unsaturation in polymer) cyclization - 3%.

EXAMPLE 5

Fifty millimoles of n-butylsodium per 100 grams of butadiene-1,3 are used as catalyst. No TMEDA is used. The procedure and conditions are the same as used in Example 1. The product contains 39% of gel. The polymer is insoluble and intractable.

However, repeating the same example, using 50 mM of n-butylsodium and 80 mM TMEDA per 100 grams of 1,3-butadiene, under the same conditions, the polymer that is obtained is soluble. The polymer analysis: 17% cis-1,4; 55% trans-1,4; and 48% vinyl 1,2 units. It contains 38% of cyclized polymer and total unsaturation of 62%.

EXAMPLE 6

Conditions same as Example 1 except that the temperature of polymerization was 75° F. and the pumping rate was 2 pounds of blend (17% butadiene in 83% hexane) per hour. Analysis of polymer: 80% 1,2; 7% cis-1,4; 13% trans-1,4; and Total Found 95% (unsaturation) 5% cyclization.

EXAMPLE 7

The catalyst is composed of 50 millimoles of n-butylsodium, 50 millimole of lithium-t-butoxide and 100 millimole of TMEDA per 100 grams of 1,3-butadiene. The conditions for the polymerization are the same as used in Example 1. The polymer has bi-modal distribution and is composed of 15% cis-1,4; 23% trans-1,4; and 61% vinyl-1,2. It contains 42% of cyclic structures as determined by NMR, and 58% total unsaturation.

EXAMPLE 8

The same conditions were used as in Example 4. Temperature of polymerization 100° F., pumping rate of 2 pounds per hour, analysis of polymer: 85% 1,2; 3% of cis-1,4; 12% trans-1,4; 93% unsaturation; 7% cyclization.

EXAMPLES 9 to 13

Further experiments were carried out under the conditions stated in Example 1, with the catalysts described below, and the properties and analysis of the polymers are given. The abbreviation "phgm" stands for "per hundred grams of 1,3-butadiene."

| Example | 9 | 10 | 11 | 12 | 13 |
|---|---|---|---|---|---|
| N-butylsodium, mM. phgm. | 50* | 50 | 40 | 18.5 | 50 |
| Lithium-t-butoxide, mM. phgm. | 50 | 50 | 50 | 25 | 50 |
| TMEDA, mM. phgm. | 100 | 100 | 80 | 50 | 100 |
| DSV | 0.08 | 0.08 | 1.0 | 1.2 | 0.12 |
| Gel | 0 | 0 | 0 | 0 | 0 |
| Cis-1,4, % | 17 | 15 | 19 | 17 | 5 |
| Trans-1,4, % | 26 | 24 | 26 | 26 | 12 |
| Vinyl-1,2, % | 57 | 61 | 55 | 57 | 83 |
| % Cyclic | 43 | 42 | 43 | 43 | 2 |
| Total unsaturation, % | 57 | 58 | 57 | 57 | 98 |

*n-butyllithium was used

Example 13 was made at 100° F., pumping rate was 2 pounds per hour of blend (17% 1,3-butadiene, 83% hexane).

EXAMPLES 14–16

Three further examples were carried out under the conditions recited in Example 1, except that for Example 16, the temperature was dropped to 75° F. and the pumping rate was 2 pounds of blend per hour. The composition of the catalyst and the properties and analysis of the polymers are given below.

| Example | 14 | 15 | 16 |
|---|---|---|---|
| Sodium metal, phgm. | 12.5 | 12.6 | 15 |
| Lithium-t-butoxide, phgm. | 12.5 | 12.6 | 15 |
| TMEDA, phgm. | 50 | 50 | 50 |
| DSV | — | 0.12 | 0.18 |
| Gel | — | 0 | 0 |
| Cis-1,4, % | 16 | 13 | 2 |
| Trans-1,4, % | 23 | 26 | 10 |
| Vinyl-1,2, % | 61 | 61 | 88 |
| Cyclic structure | 36 | 33 | 2 |
| Total unsaturation, % | 64 | 67 | 98 |

The Gel Permeation Chromatography (GPC) curve of Example 1 is shown in FIG. 1. It has an $\overline{Mn}$ molecular weight (average number molecular weight) of 1293 and $\overline{Mw}$ (average weight molecular weight) of 5307. The curve shows broad molecular weight distribution. Such tremendous broadness sometimes is not useful in the fabrication of a finished product if the strength of the finished product is reduced due to the use of a large concentration of low-molecular weight material. However, with lithium catalyst, the $\overline{Mn}$ is rather narrow.

The GPC tracing of Example 3 (FIG. 2) shows $\overline{Mn}$ of 1065, $\overline{Mw}$ of 8325 and an inherent viscosity of 1. It suggests that the presence of TMEDA had narrowed the breadth of distribution and reduced the low-molecular weight ends concentration, which were present in Example 1, in the absence of TMEDA.

In Example 9 (FIG. 3), the $\overline{Mn}$ is 1714; the $\overline{Mw}$ is 7442, viscosity is 0.99, and the $\overline{Mz}$ and $\overline{Mw}$ ratio is 1:7. $\overline{Mz}$ indicates narrow molecular weight distribution. The curve shows a narrowing in the molecular weight distribution of this polymer, suggesting that the concentration of the low-molecular weight polymer was reduced considerably. It also shows that the presence of lithium-t-butoxide and TMEDA indeed reduces the concentration of the low molecular weight species which are present in great concentration depicted in Example 1 in the absence of TMEDA and lithium-t-butoxide.

Comparative data on these three examples are given in the following table:

| Example | 1 | 3 | 9 |
|---|---|---|---|
| Temperature | 230 | 230 | 230 |
| Pumping Rate | 550 g. | 500 g. | 500 g. |
| Na-metal | 100 | 100 | 50* |
| TMEDA | — | 50 | 100 |
| Li-t-butoxide | — | — | 50 |
| Cis-1,4 Polymer | 15 | 15 | 17 |
| Trans-1,4 Polymer | 30 | 23 | 26 |
| 1,2 Polymer | 54 | 62 | 57 |
| Cyclized Polymer | 12 | 30 | 43 |
| Total Unsaturation, % | 88 | 70 | 57 |

*n-butyllithium was used instead of Na-metal.

The addition of Li-t-butoxide as in Example 9 speeds up the rate of decomposition of allylic lithium to give 43% cyclization.

It is a surprising characteristic of the cyclic polymers of this invention used in molding, that they exhibit substantially no shrinkage during curing in the mold and on removal from the mold. The following table illustrates this. The resins are prepared approximately as described in Examples 14 and 15. They are compounded as shown in the following table, which gives the proportions of major ingredients in the compounded resins, and the properties of the resins after curing in an oven for 4 minutes at 350° F. The parts are by weight. Other inert fillers such as calcium carbonate, pigments, etc., may be used, as is common in the industry. Any suitable molding conditions may be utilized. Other plastics may be used, but the cyclized polymer comprises at least 10 percent and possibly as much as 50 percent or more by weight of the elastomer present, and the total elastomer may have a shrinkage of 1 or 1.5 or 2 percent based on the dimensions of the interior of the mold and the dimensions of the cured product. Although the disclosure relates to peroxide curing, the amount of shrinkage during curing is not depending on the curing agent employed.

| Resin | No. 1 | No. 2 | No. 3 |
|---|---|---|---|
| Compounding Formulae: | | | |
| Blended polymers obtained from Examples 9 and 10: | 100 | 100 | 65 |
| Vinyl Silane | 2 | 2 | 2 |
| Silica*, 325-mesh | 380 | — | — |
| Calcium Stearate | 4 | 4 | 3 |
| Dicup 40** | 10 | 10 | 6.5 |
| Glass Powder, ¼" diameter | — | — | 65 |
| * Silica finer than 325 mesh and covered with a thin finish. | | | |
| ** 40% Dicumyl peroxide on calcium carbonate. | | | |
| Proportion of Major Ingredients: | | | |
| Resin, % | 20 | 20 | 20 |
| Silica, % | 80 | 80 | 60 |
| Glass, % | — | — | 20 |
| Properties: | | | |
| Hardness E | 78 | 14 | — |
| Flex Strength | 11,470 | — | — |

-continued

| Resin | No. 1 | No. 2 | No. 3 |
|---|---|---|---|
| Flex Modulus | 1,533,000 | — | — |
| Izod Impact, | 0.5 | — | — |
| Shrinkage, % | 1.30 | 1.31 | 0.20 |
| Surface Appearance | Very Good | — | — |

The cured polymer of this invention which contains cyclic polymer has slightly higher flux properties than the cured non-cyclic polymer, lower shrinkage, better appearance and easier processing.

I claim:

1. The process of producing a cyclized aliphatic polymer of the class consisting of homopolymers of linear conjugated dienes containing 4 to 8 carbon atoms, copolymers of conjugated dienes of 4 to 8 carbon atoms and copolymers of 60 to 75 percent by weight of a conjugated diene and a vinyl aromatic monomer, which process comprises
   a. cyclizing such a monomer or mixture of monomers in a monomer-starved solution in an aliphatic hydrocarbon solvent by permitting only a substantial minimum amount of unpolymerized monomer to be present during the polymerization,
   b. at a temperature of 0° to 300° F.,
   c. in a concentration of 5–80 percent of monomer
   d. while feeding the monomer or mixtures of monomers to a polymerization vessel at the rate of substantially 0.5 to 10 pounds per hour,
   e. providing for the monomer or monomers a residence time of 0.5 to 20 hours in the reactor,
   f. using as catalyst, per 100 grams of monomer, 5 to 200 millimoles of metallic lithium, sodium or potassium or an alkyl or aryl derivative thereof in which the alkyl group contains 1 to 8 carbon atoms and the aryl group is phenyl, tolyl or naphthyl together, with 5 to 200 millimoles of tetraalkyl alkylene diamine as co-catalyst.

2. The process of claim 1 in which the polymerization reaction mixture contains 5 to 200 millimoles of alkoxide of an alkali metal, the alkyl group containing 1 to 8 carbon atoms.

3. The process of claim 1 in which
   a. the temperature is 200°–300° F.
   b. while feeding the monomer or mixture of monomers to the polymerization vessel at a controlled rate and residence time in the reactor of 1 to 20 hours.

4. The process of claim 1 in which
   a. the temperature is 25°–150° F.
   b. while feeding the monomer or mixture of monomers to the polymerization vessel at the rate of substantially 1 to 10 pounds per hour.

5. The process of claim 1 in which the catalyst is present in the polymerization vessel when the monomer is added thereto.

* * * * *